3,320,531
ADJUSTABLE MARKER GENERATOR FOR SPECTRUM ANALYZERS

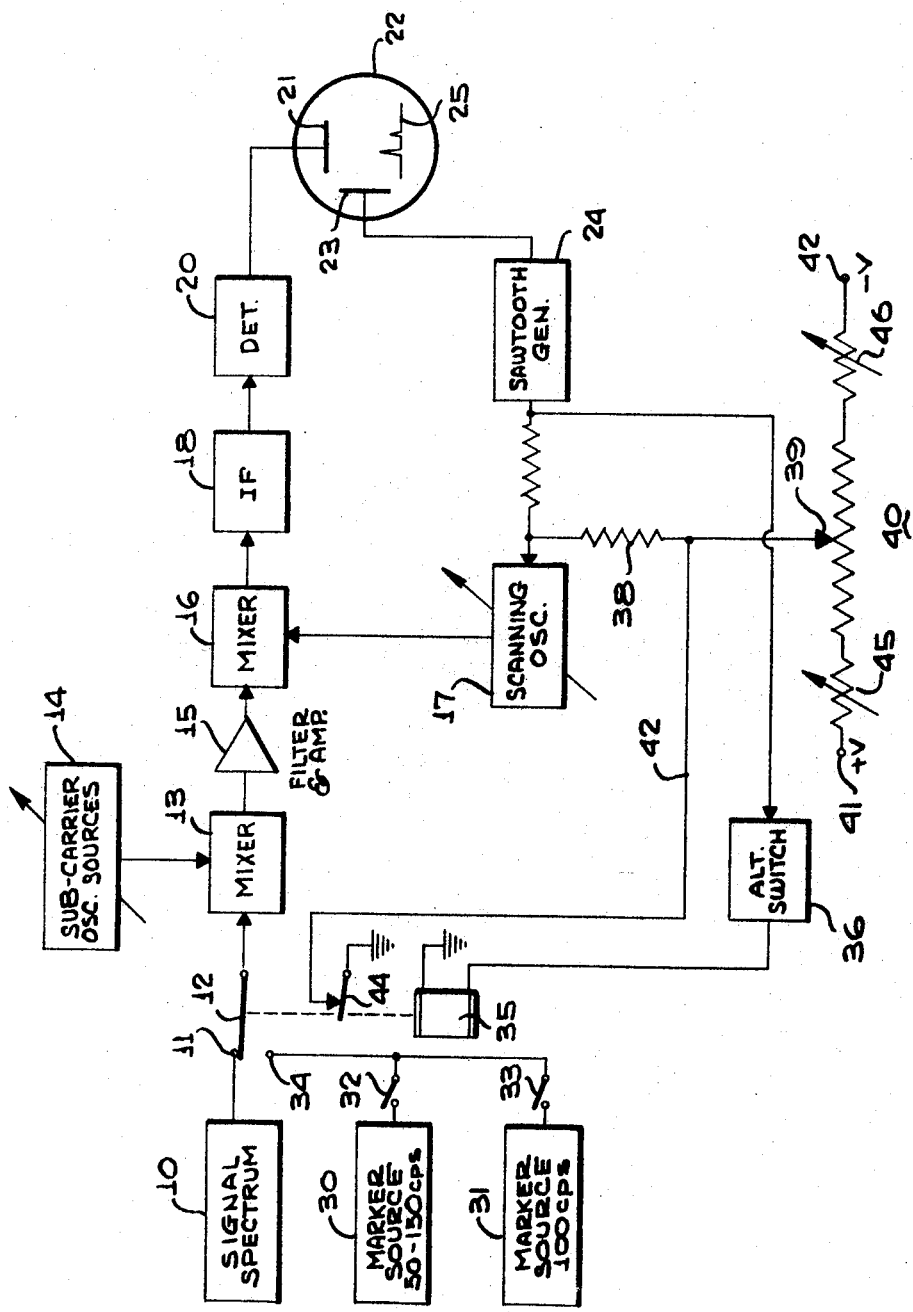

William I. L. Wu, New Rochelle, N.Y., assignor to The Singer Company, New York, N.Y., a corporation of New Jersey
Filed Mar. 13, 1963, Ser. No. 264,956
14 Claims. (Cl. 324—77)

The present invention relates generally to signal comparators, and more particularly to devices for comparing the frequencies of signals having values known only approximately, or unknown, with the frequencies of accurately known marker signals.

The present invention finds one field of application in the art of spectrum analysis. In that art the spectral components of a simple or complex signal are displayed on a cathode ray tube or X-Y indicator against a frequency calibrated base line. The base line may represent a relatively wide band, in a low frequency instrument, so that measurement of the precise frequency of any particular spectral component, with an accuracy of, for example, one c.p.s. is difficult. The usual practice is to feed into the analyzer a known frequency, derived from an adjustable marker generator, to superpose the pip derived from the marker generator on the pip representative of the unknown frequency, by adjustment of the frequency of the marker generator, and then to measure the latter frequency by means of a counter. The recited operations are quite time consuming and hence uneconomical, particularly if a large number of measurements is required.

According to the present invention, a calibrated potentiometer is provided, which provides accurate center frequency control potential to the scanning oscillator of a spectrum analyzer. The potentiometer is calibrated in terms of frequency at its end points, and if desired at its center point, and is arranged to provide a voltage ranging from + at one end, through ground at its center, to − at its other end. Accurate marker sources are employed to establish correct frequencies corresponding with the three critical points of the potentiometer, i.e., end points and center. The spectrum analyzer is arranged to scan an unknown spectrum and the marker signals in alternation; and to ground or disable the potentiometer while scanning the spectrum. Thereafter, the value of any unknown frequency can be established by varying the slider of the potentiometer until the unknown signal, with slider grounded, i.e., potentiometer disabled, provides a pip superposed on the pip of a known marker frequency, with slider ungrounded, reading the frequency value on the potentiometer. Thereby, only a small number of fixed marker frequencies is required and accurate interpolation therebetween is provided by the potentiometer.

In order that the potentiometer encompass only a small frequency range, and hence be extremely accurate, heterodyne devices apart from the potentiometer are utilized to select frequency sub-bands, so that any desired signal in a wide band can be brought within the comparison capabilities of a narrow range potentiometer.

It is, accordingly, a broad object of the present invention to provide a novel frequency comparator.

It is a further object of the invention to provide a frequency comparator for a spectrum analyzer, wherein unknown frequencies are scanned while the mean frequency of a scanning oscillator is fixed at a known value, such as ground, and known frequencies are scanned, the mean frequency of the scanning oscillator being adjusted when scanning the known frequencies to provide superposition of the known and unknown frequencies, the unknown frequency being determined by measuring the adjustment required to effect the necessary departure of the adjusted mean frequency from its unadjusted value.

A further object of the invention is to provide a system for comparing two frequencies visually, when presented as visual marks against a frequency base line by a frequency scanning process, which comprises relatively moving the base line during alternate scans of the two frequencies, by amounts ascertainable in terms of frequency deviation, until the visual marks are superposed.

The above and still further objects, features and advantages of the present invention will become apparent upon consideration of the following detailed description of one specific embodiment thereof, especially when taken in conjunction with the accompanying drawings, wherein:

The single figure of the drawings is a block diagram of a preferred embodiment of the invention.

Referring now more particularly to the accompanying drawings, the reference numeral 10 denotes a source of a relatively wide band frequency spectrum, connected to a switch terminal 11. Associated with the latter is a movable contact 12 which leads to a mixer 13. To the latter is supplied any selected one of a plurality of crystal controlled local oscillator sources 14, which may have separations, for example, of 100 c.p.s. (selected for convenience only), if the input spectrum is an audio spectrum.

The output of the mixer 14 is supplied to a filter and amplifier 15, which selects one 100-c.p.s. side-band of the output of the mixer 13 to the exclusion of both the other side bands and the local oscillator frequency. The selected side-band is applied to a further mixer 16, which is supplied with scanning oscillator output from oscillator 17 and which leads to a very narrow band I.F. filter 18, say of 1 c.p.s. or 2 c.p.s. bandwidth.

The scanning oscillator 17 heterodynes the frequencies of the band of interest, as supplied by wide band filter and amplifier 15, one by one into the narrow band I.F. amplifier 18, in accordance with a technique which is classic in the art of spectrum analysis.

The output of the I.F. amplifier 18 is detected in a video detector 20, and the video signal applied, usually after amplification, to the vertical deflection electrode 21 of a cathode ray tube indicator 22. To the horizontal deflection electrode 23 is supplied the output of a sawtooth voltage generator 24, which causes a horizontal sweep and hence generates a horizontal base line 25 on the face of the indicator 22. The sawtooth generator 24 is utilized also to control the scan of the scanning or sweeping oscillator 17, so that the base line 25 represents frequency, and may be calibrated in terms of frequency.

To this point in the description, the system is conventional, except for the provision for selecting any desired 100-c.p.s. sub-band of a wide audio band for further detailed spectrum analysis. The problem then exists of measuring very accurately, i.e., to 1 c.p.s., the frequency of any pip appearing against the base line 25. This cannot be accomplished with the required accuracy by calibrating the face of the cathode ray tube indicator, and is normally accomplished in practice by comparison of an input frequency with a known frequency. More specifically, it is usual to insert a marker signal from a variable source, adjusting the latter until superposition of the marker pip and unknown pip is attained. The operator then knows that he has precise frequency coincidence, and can measure the marker frequency by means of a frequency counter. Since accurate frequency counters are slow, and subject to false counts in the presence of noise, the presently applied system is uneconomical of time and subject to error.

Marker signals may be provided in terms of two distinct marker generators 30, and 31, of which 30 may supply a pair of frequencies separated by 100 c.p.s., which are odd harmonics of a base frequency, i.e., 50 c.p.s. and 150 c.p.s. The marker generator 31 may, for the case indicated, supply the intermediate frequency of 100 c.p.s. The generators 30 and 31 may be selected at will by switches 32, 33, and their inputs supplied to a terminal 34. The latter terminal may be selected by movable contact 12, in alternation with terminal 11, so that either the marker signals or the signal spectrum is applied at any one time to the input of mixer 13, during normal operation of the system. The movable contact 12 may be the armature of a relay, comprising a relay coil 34, which is actuated into energized and de-energized condition by an alternating switch, 36, synchronized with the sweeps of sawtooth generator 24. Accordingly, movable contact 12 is alternately up and down, for alternate sweeps.

Connected to the control input terminal of scanning oscillator 17, via an isolating resistance 38, is the slider 39 of a potentiometer 40. The latter includes two terminals 41 and 42, which are respectively connected to equal positive and negative voltage sources, +V and −V (not shown). The slider 39 is also connected via a lead 43 through relay contacts 44, to ground. The contacts 44 are actuated by relay coil 35. It follows that slider 39 is grounded when the signal spectrum source 10 is in circuit, but not when the marker signal generators are in circuit.

The potential at slider 39 sets the average value of the frequency of the scanning oscillator 17, so that if the sawtooth generator 24 were disabled and the slider 39 grounded, the "spot" position of cathode ray tube indicator 22 would correctly be centrally of the screen, i.e., at the 100-c.p.s. position. The potentials of terminals 41, 42 are set so that when slider 39 is at these points, the spot position would be correctly at the 50-c.p.s. and 150 c.p.s. locations. The potentiometer is linear and may be considered accurately calibrated for all slider positions, when calibrated for the three positions specified.

To calibrate and adjust the system, marker source 31 may be connected in circuit, and slider 39 ungrounded while centrally located, and scanning oscillator 17 adjusted to place the resulting pip at the 100-c.p.s. point of the frequency scale. The marker generator 30 is then connected in circuit, and the slider moved to its end positions. At these end positions the potentiometer 40 is adjusted to place its pips for 50 c.p.s. and 150 c.p.s. correctly. Provision is available for adjusting the potentiometer, in the form of variable end resistances 45, 46. In the manner recited, the potentiometer can be calibrated at its center point and at its end points, to correspond respectively to 100 c.p.s., and to 50, 150 c.p.s. and the indicator 22, and the sawtooth generator 24, can be adjusted to have a 100-c.p.s. sweep which corresponds with the frequency calibration marks on the indicator and with the outputs of the marker sources 30, 31.

Having adjusted the system, a signal spectrum may be applied to terminal 11. For simplicity of explanation it may be assumed that the spectrum includes a single frequency, which provides a single pip on the screen of cathode ray tube indicator 22. The signal spectrum generates a pip on a first sweep of scanning oscillator 17. On the next succeeding sweep the signal spectrum is disconnected and one of the marker sources is connected, say 31, and generates a pip. While the signal spectrum was connected the slider 39 was grounded via contacts 44, so that the influence of the potentiometer was nil. When the marker source 31 is connected in circuit the slider 39 is ungrounded, so that the slider 39 can adjust the mid-point of the sweep, i.e., the average frequency of scanning oscillator 17. The slider 39 is adjusted until the spectrum pip and the marker pip coincide, and the deviation of the slider, plus or minus, from mid-position noted. The frequency of the marker signal plus the algebraic value of the deviation accurately measures the frequency of the spectrum signals, insofar as the potentiometer 40 is accurately calibrated.

It can be assumed, with negligible error, that the potentiometer 40 is linear. It follows that it need only be calibrated at its end points and at its mid-point, and that reliance may be placed on linearity of scale intermediate the three accurately calibrated points.

It will be clear that the precise method employed for calibrating the potentiometer 40 in terms of frequency deviations is not central to the circuit of the invention, and that this may be accomplished by means of a variable test oscillator and cycle counter, if desired. In the latter case as many calibration points as desired, along the potentiometer, may be employed.

A simple and effective mode of calibrating the potentiometer 40 is to connect the marker sources simultaneously as such and as signal spectrum. For example, if the 100-c.p.s. marker signal is inserted at both terminals 11 and 34, the correct center setting of slider 39 can be readily accomplished, and the correct zero of the calibration of potentiometer 40 determined. If the marker source 30 is connected to terminal 34 and the marker source 31 to terminal 11, the 50-c.p.s. deviation points of slider 39 may be readily ascertained. If terminals 11 and 34 are bridged, with switches 32, 33 closed, adjustment of variable resistances 45, 46 may be readily accomplished, as well as center setting of slider 39, since only for correct settings will a total of only three pips be visible.

Since the marker signals deriving from sources 30, 31 are subjected to the same frequency conversions and amplifications as are the components of the signal spectrum, accurate comparison of signal amplitudes with marker amplitudes may be accomplished by means of the present system.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a scanning spectrum analyzer, means for scanning in first scans over an unknown frequency and visually plotting the said unknown frequency against a base line means for scanning in second scans over a known comparison frequency and visually plotting the said known comparison frequency against said base line, means for shifting the frequency limits of only one of said scans with respect to the frequency limits of the other of said scans so that the visual plots coincide, means for indicating the extent of frequency shift required to establish the coincidence and means automatically interspersing said scans.

2. The combination according to claim 1 wherein is provided means for repeating said first and second scans automatically in alternation while operating said means for shifting to shift said frequency limits.

3. The combination according to claim 2 wherein said means for shifting is a source of variable direct voltage, and wherein said means for scanning includes a voltage responsive scanning oscillator, means always connecting a source of repetitive scanning voltage to said oscillator and means connecting said source of variable direct voltage to said oscillator in superposition of said scanning voltage only during said second scan only.

4. The combination according to claim 3 wherein said source of variable direct voltage is a potentiometer connected between positive and negative voltage terminals and having a point of zero voltage intermediate said terminals, said potentiometer including a slider providing said source of variable direct voltage.

5. The combination according to claim 4 wherein is provided means for grounding said slider only while one of said frequencies is being scanned.

6. In a system for measuring frequency, means for visually plotting the position of a known frequency against a first frequency representative base line, means for visually plotting the position of an unknown frequency against a second frequency representative base line, means for relatively adjusting said base lines relative to one another automatically in alternation to effect a simultaneous visual coincidence of said plots, and means for indicating the deviation of said base lines relative to one another required to effect said visual coincidence as a measure of the difference of said known and unknown frequencies.

7. In a system for measuring the frequency of a first signal of first frequency,
- a source of a second signal of second frequency,
- means for plotting the frequency of said first signal and the frequency of said second signal in alternate plots, said means including a scanning heterodyne spectrum analyzer having a scanning local oscillator,
- means providing said scanning local oscillator with a first center frequency and scan limits only while generating one of said alternate plots, and
- means for varying said first center frequency and scan limits to a second center frequency and scan limits for provision in said spectrum analyzer only during the other of said alternate plots, whereby said scanning superheterodyne spectrum analyzer generates said alternate plots with different center frequencies and scan limits which are relatively adjustable.

8. A scanning superheterodyne spectrum analyzer including
- a first signal input terminal,
- a second signal input terminal,
- a heterodyne mixer having input circuitry,
- means connecting said input terminals to said input circuitry in alternation,
- a frequency scanning oscillator connected to said heterodyne mixer,
- a source of sawtooth voltage,
- a source of D.C. voltage,
- means superposing said D.C. voltage on said sawtooth voltage,
- means responsive to said sawtooth voltage and said D.C. voltage for effecting frequency scanning of said frequency scanning oscillator over predetermined values, and
- means disabling said source of D.C. voltage only while said switch means is operative to connect one of said input terminals to said input circuitry, whereby said predetermined values may be different in alternation as a function of the magnitude of said D.C. voltage.

9. The combination according to claim 8 wherein said source of D.C. voltage includes a voltage divider,
- said voltage divider having voltage input terminals and a slider for deriving said D.C. voltage,
- said voltage input terminals being one positive and the other negative, whereby said slider has available to it a point of zero voltage along said voltage divider.

10. In a system for examining a frequency spectrum,
- a scanning spectrum analyzer having an input terminal and a spectrum display generator,
- a source of a marker spectrum,
- means for providing successive scans of said spectrum analyzer while applying said marker spectrum and said frequency to said input terminal during alternate ones of said scans,
- means modifying one of said scans only to attain a coincidence of said spectrum display of said spectrum display generator during said successive scans,
- said spectrum analyzer being a superheterodyne spectrum analyzer having a single scanning local oscillator,
- said means for modifying one of said scans being a means for adjusting the mean frequency of said scanning local oscillator.

11. The combination according to claim 10 wherein said means for adjusting the mean frequency of said scanning local oscillator is a potentiometer, and means for applying adjustable direct voltage from said potentiometer to control said mean frequency of said scanning local oscillator.

12. The combination according to claim 11 wherein said potentiometer includes end points, and means for maintaining said end points respectively positive and negative by equal amounts with respect to ground.

13. The combination according to claim 12 wherein said marker spectrum includes at least frequencies appropriate to said end points.

14. The combination according to claim 13 wherein said marker spectrum includes at least a frequency appropriate to the mid point of said potentiometer.

References Cited by the Examiner

UNITED STATES PATENTS

| | | |
|---|---|---|
| 2,451,320 | 10/1948 | Clammer et al. _____ 324—79 |
| 2,661,419 | 12/1954 | Tongue _____ 324—77 X |
| 2,760,081 | 8/1956 | Wu. |
| 2,967,931 | 1/1961 | Willis _____ 324—79 X |
| 3,017,573 | 1/1962 | Hoffmann _____ 324—77 |
| 3,019,389 | 1/1962 | Ross et al. _____ 324—77 |
| 3,156,867 | 11/1964 | Whitwell et al. _____ 324—79 X |

WALTER L. CARLSON, *Primary Examiner.*

A. E. RICHMOND, P. F. WILLE, *Assistant Examiners.*